United States Patent

[11] 3,619,242

| [72] | Inventors | Masao Ogawa<br>Tokyo;<br>Shigeo Hayashi, Yokohama-shi; Wasuke Sato, Kawasaki-shi; Ichiro Morimoto, Kawasaki-shi; Teisuke Horibe, Tokyo; Gunji Takeuchi, Yokohama-shi, all of Japan |
|---|---|---|
| [21] | Appl. No. | 786,466 |
| [22] | Filed | Dec. 23, 1968 |
| [45] | Patented | Nov. 9, 1971 |
| [73] | Assignee | Shawa Denko K. K.<br>Tokyo, Japan |
| [32] | Priority | Feb. 1, 1968 |
| [33] | | Japan |
| [31] | | 43/6137 |

[54] METHOD FOR TREATING THE SURFACE OF A SUBSTRATE SHEET
6 Claims, No Drawings

[52] U.S. Cl............................................... 117/46 FC,
117/72, 117/93.1 CD, 117/132 C, 117/138.8 N,
117/138.8 PV, 117/138.8 UA, 117/155 R,
117/155 UA, 117/161 P, 117/161 UZ, 161/252,
161/254
[51] Int. Cl...................................................... B44d 1/50,
B44d 1/097

[50] Field of Search....................................... 117/46 FS,
46 CC, 46 FC, 93.1, 72, 121, 143, 152, 155, 161
UZ, 132 C, 62, 161 UF, 161 P, 138 N, 138 PV,
138 UA; 161/252, 254

[56] References Cited
UNITED STATES PATENTS

| 2,801,447 | 8/1957 | Wolinski | 18/48 |
| 2,907,671 | 10/1959 | Duvivier | 117/46 X |
| 2,935,418 | 5/1960 | Berthold et al. | 117/93.1 X |
| 2,962,387 | 11/1960 | Noeske et al. | 117/47 |
| 3,243,394 | 3/1966 | Deitz | 117/161 X |
| 3,458,350 | 7/1969 | Bartow et al. | 117/161 |

*Primary Examiner*—Alfred L. Leavitt
*Assistant Examiner*—Edward G. Whitby
*Attorney*—Flynn & Frishauf

ABSTRACT: A method for treating the surface of a substrate sheet which comprises coating at least one side of a substrate sheet with a solution prepared by dissolving in an organic solvent chlorinated polyethylene containing 40 to 75 percent by weight of chlorine or a mixture of 99 to 50 percent by weight of said chlorinated polyethylene and 1 to 50 percent by weight of chlorinated polypropylene containing 25 to 35 percent by weight of chlorine and, if necessary further treating the surface of the coated layer with corona discharges or flames.

METHOD FOR TREATING THE SURFACE OF A SUBSTRATE SHEET

The present invention relates to a surface treating method applicable to all types of substrate sheets, no matter whether they are made of natural, synthetic, organic, inorganic, metallic or nonmetallic materials.

Various kinds of substrate sheets chiefly used as packing material such as plastic films, aluminum foils, paper, etc. have the drawbacks that they have poor adhesivity to paints and plastic films and that their sealability is not always satisfactory.

To improve such shortcomings of substrate sheets, there have heretofore been made a number of attempts. For instance, where a laminate film is prepared by laminating polyethylene on a polypropylene film, there has generally been adopted a process of coating the surface of the polypropylene film with undercoating materials such as a solution of alkyl titanates or isocyanates and laminating polyethylene on the coated layer. However, this process is handicapped by the fact that the aforesaid alkyl titanate solution used as an undercoating material tends to reduce the effect of surface treatment due to its hygroscopicity, and that the isocyanate undercoating material is generally a two-liquid system, namely, composed of a solution of isocyanates and alcohols or amines, so that it is difficult to handle. In addition, there has been used another process wherein the undercoating material used in coating a copolymer of vinylidene chloride on the surface of a polypropylene film consists of the aforesaid system of isocyanates and alcohols or amines, or a system of an epoxy resin and hardening agent. These undercoating materials are all of a two-liquid type and difficult to handle. Moreover, since such two-liquid undercoating material requires long hours of drying at elevated temperatures, the film is likely to shrink in drying.

As mentioned above, any of the prior surface treating processes has not only been unsatisfactory, but also in some cases there has been found no suitable method of surface treatment depending on the material of substrates. For instance, there is not known at the present moment any good method for treating the surface of a polyethylene film so as strongly to bond a vinylidene chloride copolymer therewith.

The present invention relates to a method for treating the surface of a substrate sheet which comprises coating at least one side of the substrate sheet with an organic solution of chlorinated polyethylene containing 40 to 75 percent by weight of chlorine for surface treatment of said sheet.

The surface treating solution may also be prepared from a mixture of 1 to 50 percent by weight of chlorinated polypropylene containing 25 to 35 percent by weight of chlorine and 99 to 50 percent by weight of aforesaid chlorinated polyethylene instead of said chlorinated polyethylene used singly.

The surface treating method of the present invention enables a substrate sheet to be prominently improved or increased in sealability and adhesivity to various kinds of paints and films and display far more excellent properties as packing material than has been possible with the prior art. For instance, where the surface of the substrate sheet is to be coated with a paint solution or aqueous dispersion prepared from a copolymer of vinyl chloride or that of vinylidene chloride, a solution mainly consisting of nitrocellulose, or extruded polyethylene so as to improve the properties of the surface of said substrate sheet, the advance application of the aforesaid surface treating solution to the substrate sheet as an undercoating material noticeably improves the adhesivity of the substrate sheet to the coatings or layers coated thereon with the result that the bonding strength therebetween is greatly elevated. Further, if the aforesaid surface treating solution is applied to the surface of a substrate sheet and, while heating the mass, the same or different kind of substrate sheet is overlayed thereon, then there will be obtained a laminate body having an extremely great stripping strength. The present invention has the advantage that the solution used in surface treatment consists of a one-liquid system, namely, an organic solution of chlorinated polyethylene used singly or that of a mixture of chlorinated polypropylene therewith, thus offering convenience in handling and consequently in bonding operation.

When at least one side of a substrate sheet is coated with an organic solution of chlorinated polyethylene containing 40 to 75 percent by weight of chlorine or that of a mixture of 99 to 50 percent by weight of said chlorinated polyethylene and 1 to 50 percent by weight of chlorinated polypropylene containing 25 to 35 percent by weight of chlorine, said substrate sheet can be improved or increased mainly in sealability and adhesivity to various kinds of paints and films.

As mentioned above, a substrate sheet whose surface condition can be improved by the present invention may consist of natural substances, synthetics, organics, inorganics, metals, nonmetals, etc. However, the material of said sheet is not limited to those listed. The substrate sheet includes, for example, films of polypropylene, polyethylene, polyvinyl chloride, polyvinylidene chloride, polyesters, polyamides, polyvinyl alcohols, polyacrylonitrile and cellulose, aluminum foils, paper, cotton cloth, synthetic fiber cloth, etc., which are chiefly used in packing materials.

According to the present invention, the chlorinated polyethylene may consist of high or low density polyethylene chlorinated by any optional method such as a fluidized, aqueous suspension or solution process. More concretely, there is used chlorinated polyethylene containing 40 to 75 percent by weight or preferably 55 to 65 percent by weight of chlorine. Namely, there is used the chlorinated polyethylene whose toluene solution at 35° C. has an intrinsic viscosity (expressed by $$[\eta]_{Tol}^{35°C.}$$

preferably of 0.1 to 3.0 g./cc., or more preferably of 0.5 to 1.5 g./cc. The reason why the chlorine content of the aforesaid chlorinated polyethylene has been limited as described above is that chlorinated polyethylene containing less than 40 percent by weight of chlorine has poor solubility in an organic solvent, whereas chlorinated polyethylene containing more than 75 percent by weight of chlorine is not only difficult to manufacture but also has low thermal stability.

Referring to the intrinsic viscosity of chlorinated polyethylene, a value of less than 0.1 results in the reduced adhesivity of the treated surface of a substrate sheet, while a value of more than 3 obstructs the surface treatment due to the high viscosity of the chlorinated polyethylene. Accordingly, the aforementioned range of from 0.1 to 3 is preferable.

The chlorinated polypropylene jointly used with chlorinated polyethylene is prepared by a solution or suspension process, etc., with the chlorine content of 25 to 35 percent by weight. It is also suitable to use the chlorinated polypropylene whose 30 percent toluene solution at 35° C. has a viscosity of 5 to 300 poises. The chlorinated polyethylene and chlorinated polypropylene are mixed in the ratio of 99 to 50 percent by weight or preferably 95 to 85 percent by weight for the former and 1 to 50 percent by weight or preferably 5 to 15 percent by weight for the latter, because the mixing ratios other than specified as above lead to the poor adhesivity of the treated surface of a substrate sheet.

It is for the following reason that the chlorine content of the chlorinated polypropylene has been limited as described above. Namely, chlorinated polypropylene containing less than 25 percent by weight of chlorine presents difficulties in chlorination, has low solubility in a solvent and obstructs handling due to its high viscosity, whereas a chlorine content exceeding 35 percent by weight degrades the adhesivity of the treated surface of a substrate sheet. With respect to the viscosity of chlorinated polypropylene, a value of less than 5 poises reduces the adhesivity of the treated surface of a substrate sheet, while a value beyond 300 poises results in the high viscosity of chlorinated polypropylene, making it difficult to handle it. Accordingly, it is preferable to use chlorinated polypropylene having a viscosity of from 5 to 300 poises.

When one or both sides of a substrate sheet are coated partly or wholly with a surface treating solution prepared by dissolving chlorinated polyethylene or a mixture of chlorinated polypropylene therewith in an organic solvent such as toluene, the surface condition of the substrate can be improved as desired above. In addition to the aforesaid toluene, the organic solvent may include benzene, xylene, carbon tetrachloride, chloroform, trichloethylene, perchloroethylene, etc. It is also possible to treat the surface of a substrate sheet with corona discharges or flames before said surface is coated with the aforementioned surface treating solution. Also where the surface of a substrate sheet is treated with corona discharges or flames after it is coated with the surface treating solution, the surface of the substrate sheet will be rendered more adhesive to various types of paints and films.

There will now be described the present invention with reference to the examples which follow. It will be understood that they are offered only by way of illustration and should not be construed to restrict the scope and breadth of the invention or limit the scope of the patent claims appended hereto.

EXAMPLE 1

A biaxial stretched polypropylene film was treated with corona discharges in such a manner that water at a temperature of 20° C. contacted the film at an angle of 65°.

Thereafter one side of the film was subjected to the gravure coating of a 5 percent toluene solution of amorphous chlorinated polyethylene containing 50 percent by weight of chlorine and having a viscosity of $$[\eta]_{Tol}^{35°C.} = 1.2$$

which was prepared by chlorinating high density polyethylene by the aqueous suspension process. The mass was dried for 0.5 minute at a temperature of 80° C. to form an undercoating layer. Then there were applied corona discharges to the undercoating layer using the same method and under the same conditions as described above. The undercoating layer was further subjected to the gravure coating of a 50 percent aqueous latex of a copolymer of vinylidene chloride and acrylic ester to form a top layer.

Such type of undercoating material heretofore generally consisted of a two-liquid system as referred to above. However, the undercoating material composed of chlorinated polyethylene prepared in accordance with this example was easier to handle than the two-liquid system. Further unlike the conventional two-liquid undercoating material, the chlorinated polyethylene of the present invention eliminated the necessity of carrying out drying for long hours at elevated temperatures and prevented the film from shrinking at the time of drying. And the polypropylene film and top layer deposited thereon were bonded together with an adhesive strength of 110 g./cm., which was even superior to 106 g./cm. obtained with the prior isocyanate undercoating material.

EXAMPLE 2

One side of a biaxial stretched polyester film was coated with a 3 percent toluene solution of amorphous chlorinated polyethylene containing 60 percent by weight of chlorine and having a viscosity of $$[\eta]_{Tol}^{35°C.} = 1.0$$

which was prepared by chlorinating the same polyethylene as in example 1 in the same manner. The mass was dried for 0.3 minute at a temperature of 80° C. to form an undercoating layer. The layer was then treated with corona discharges in the same manner as in example 1. On the surface of the undercoating layer thus treated was applied the gravure coating of a 10 percent ethyl acetate solution of a copolymer of vinyl chloride and vinyl acetate to form a top layer. The film thus prepared was easily sealed with a stripping strength of 100 g./cm. However, the polyester film which did not receive the aforementioned treatment was difficult to seal, and lacked adhesivity to any top layer. Moreover, there has heretofore not been discovered any effective undercoating material to assure firm bonding therebetween.

EXAMPLE 3

The same biaxial stretched polypropylene film as in example 1 was treated with flames in such a manner that water at a temperature of 20° C. contacted the film at an angle of 70°. On one side of the film was applied to roll coating of a 5 percent toluene solution of amorphous chlorinated polyethylene containing 65 percent by weight of chlorine and having a viscosity of $$[\eta]_{Tol}^{35°C.} = 0.5$$

which was prepared by chlorinating low density polyethylene by the solution process. The mass was dried for 0.5 minute at a temperature of 80° C. to form an undercoating layer. The layer was again treated with flames in the same manner as described above. On the undercoating layer was further applied the gravure coating of a 15 percent tetrahydrofuran solution of a copolymer of vinylidene chloride and acrylonitride to form a top layer. The film thus prepared displayed the same properties as that obtained in example 1.

EXAMPLE 4

One side of a biaxial stretched polyamide film was coated with a 4 percent toluene solution of the chlorinated polyethylene prepared in the same manner as in example 1 excepting that it had a viscosity of $$[\eta]_{Tol}^{35°C.} = 1.3$$

and contained 45 percent by weight of chlorine. The mass was dried for 0.6 minute at a temperature of 75° C. to form an undercoating layer. The layer was subjected to the gravure coating of a lacquer mainly consisting of nitrocellulose to form a top layer. The film exhibited substantially the same properties as that obtained in example 2.

EXAMPLE 5

A polyethylene film was used in place of a biaxial stretched polypropylene film. The process up to the formation of an undercoating layer was conducted in the same manner as in example 1 and the subsequent step was carried out similarly to example 3. The polyethylene film thus treated permitted a vinylidene chloride copolymer to be bonded therewith with such an extremely great adhesivity as has heretofore not been realized. When two polyethylene films each bonded with a vinylidene chloride copolymer were heat sealed at a temperature of 140° C. with said copolymers attached to each other, the advance application of the aforesaid undercoating material increased the overall stripping strength of the composite film to 100 g./cm. as against 50 g./cm. when the composite film was heat sealed without the prior use of said undercoating material.

EXAMPLE 6

A polyvinyl alcohol film was used instead of a biaxial stretched polypropylene film. The surface of the film was treated in the same manner as in example 3 excepting that : was not conducted a flame treatment prior to the forma-
 of an undercoating material and that treatment after the
 .cation of said undercoating material was carried out with
 na discharges as in example 1 in place of using flames.
 polyvinyl alcohol film on which was bonded a top layer by
 ,forementioned treatment was rendered heat sealable, the
 ping strength of the film being 130 g./cm. (130°C.). Since
 indercoating material was a one-liquid system, said treat-
 t was performed with great ease. Heretofore, there has not
 i known at all any undercoating material displaying such
 ninent effect.

EXAMPLE 7 biaxial stretched polypropylene film was treated with
 ina discharges in the same manner as in example 1, and
 i coated with an undercoating material in the same manner
 n example 3. There was again conducted a corona
 harge treatment as in example 1. On the undercoating
 r thus treated was extruded polyethylene to a thickness of
 nicrons to form a laminate film. Unlike the undercoating
 erial made of the aforesaid alkyl titanate or isocyanate
 em which has heretofore been used in such laminate film,
 undercoating material employed in this example was easy
 handle and prevented the bonding effect form being
 iced due to absorption of moisture or other unfavorable
 ses. Further this undercoating material caused the biaxial
 tched polypropylene film and polyethylene layer to be
 ded together with an extremely great strength. The
 inate film of the present invention bonded with the un-
 coating material prepared according to this example ex-
 .ted an adhesive strength of 150 g./cm. as against 120
 m. of a similar film bonded with the prior undercoating
 :erial.

EXAMPLE 8 i nonstretched polypropylene film was subjected to the
 ie flame treatment as in example 3. On the film thus treated
 i formed an undercoating layer in the same manner as in
 .mple 2. The same flame treatment was again applied to the
 lercoating layer, on which there was laminated
 yethylene in the same manner as in example 7. The
 ultant laminate film displayed the same properties as that of
 imple 7.

EXAMPLE 9

)ne side of an aluminum foil was coated with the same un-
 :coating material as in example 1. After drying for 0.5
 aute at a temperature of 80° C., polyethylene was laminated
 :reon in the same manner as in example 7. This laminating
 icess eased the treating operation as much as in example 7,
 i laminate film displayed a superior adhesivity of 120 g./cm.
 100 g./cm. of a similar product of the prior art.

EXAMPLE 10

One side of a cotton cloth was subjected to the gravure
 iting of a 10 percent toluene solution of the same
 lorinated polyethylene as in example 1. After drying for 0.6
 nute at a temperature of 80° C., there was formed an un-
 rcoating layer, on which was then extruded polyethylene to
 thickness of 15 microns for lamination. The laminate
 oduct had an adhesive strength of 200 g./cm. In this exam-
 :, as well as in example 7, the undercoating material was far
 sier to handle than that prepared by the prior art, so that
 eration was performed smoothly.

EXAMPLE 11

A biaxial stretched polypropylene film was subjected to the
me flame treatment as in example 3. One side of the film was
en coated with a 10 percent toluene solution of the same
lorinated polyethylene as in example 3 to a thickness of 2
crons excepting that said polyethylene had a viscosity of $$[\eta]_{Tol}^{35°C} = 0.8$$

and contained 70 percent by weight of chlorine. The film to
which was applied such surface treatment was found heat
sealable as it was. Thus one kind of surface treating solution
used in this example displayed the same effect as the conven-
tional undercoating material consisting of two kinds of paints,
namely, upper and lower layers thereof.

EXAMPLE 12

A biaxial stretched polyester film was coated with the same
undercoating material as in example 11 without applying
corona discharges to said film. This product exhibited the
same effect as that of example 11.

EXAMPLE 13

A cellulose film was used instead of a biaxial stretched
polyester film. The same treatment as in example 12 was ap-
plied to the cellulose film. The surface treating solution coated
on said film rendered it heat sealable. It was found therefore
that said surface treating solution was adapted for heat sealing
and eliminated the necessity of incorporating any additives
with the resultant prevention of any occurrence of blocking.

EXAMPLE 14

One side of a polyacrylonitride film was only coated with an
undercoating material in the same manner as in example 2.
The coated layer itself rendered the polyacrylonitride film
satisfactorily heat sealable with a stripping strength of 100
g./cm. at a temperature of 130° C.

EXAMPLE 15

A polyvinyl chloride film was treated with corona
discharges in the same manner as in example 1. The film was
then coated with the same undercoating material as in exam-
ple 14. The film thus treated displayed good heat sealability
with a stripping strength of 100 g./cm. at a temperature of
130° C.

EXAMPLE 16

A polyvinylidene chloride film was subjected to the same
primary treatment as in example 15 and coated with the same
undercoating material. The film exhibited good heat sealabili-
ty with a stripping strength of 90 g./cm. at a temperature of
120° C.

EXAMPLE 17

A biaxial stretched polypropylene film was subjected to the
same primary treatment as in example 1. To the film was ap-
plied the gravure coating of the same solution of chlorinated
polyethylene as in example 13. After thermal drying, the mass
was superposed on a cardboard with pressure before it was
fully cooled, thus enabling the polypropylene film to be pasted
to paper. In this case, operation was performed with greater
ease than when the conventional adhesive made of a two-
liquid isocyanate system was used.

EXAMPLE 18

A fabric woven from a stretched tape of low-pressure
polyethylene was coated with the same chlorinated
polyethylene as in example 10. On this undercoating layer was
superposed a high-pressure polyethylene film. The fabric and
film were easily and firmly bonded with a stripping strength of
100 g./cm.

EXAMPLE 19

The surface of a biaxial stretched polypropylene film was
treated in the same manner as in example 1 excepting that
there was used in place of the 5 percent toluene solution of
chlorinated polyethylene used in example 1 a 5 percent toluene solution of a mixture of 90 percent by weight of the chlorinated polyethylene used in example 1 and 10 percent by weight of chlorinated polypropylene containing 28 percent by weight of chlorine and whose 30 percent toluene solution at 35° C. had a viscosity of 100 poises. On the polypropylene film thus treated was formed the same top layer as in example 1. The thermal adhesivity between the top layers formed on two polypropylene films thus prepared was 160 g./cm.

EXAMPLE 20

A nonstretched polypropylene film was subjected to the same flame treatment as in example 3. One side of the polypropylene film thus treated was coated with a 3 percent toluene solution of a mixture of 85 percent by weight of chlorinated high density polyethylene containing 60 percent by weight of chlorine and having a viscosity of $$[\eta]_{Tol}^{35°C.} = 1.0$$

and 15 percent by weight of chlorinated polypropylene containing 30 percent by weight of chlorine and whose 30 percent toluene solution at 35° C. had a viscosity of 50 poises. The mass was dried for 0.5 minute at a temperature of 80° C. to form an undercoating layer. There was again applied the same flame treatment to the undercoating layer. On the layer thus treated was laminated polyethylene in the same manner as in example 7. The adhesivity between the polypropylene film and polyethylene layer showed an adhesive strength of 190 g./cm.

EXAMPLE 21

One side of an aluminum foil was coated with a 5 percent toluene solution of a mixture of 95 percent by weight of the chlorinated polyethylene used in example 1 and 5 percent by weight of chlorinated polypropylene containing 26 percent by weight of chlorine and whose 30 percent toluene solution at 35° C. had a viscosity of 20 poises. After drying for 0.6 minute at a temperature of 80° C., there was laminated polyethylene on the undercoating layer in the same manner as in example 7. Treatment was performed as easily as in example 7. The aluminum foil and polyethylene layer were bonded together with an adhesive strength of 150 g./cm.

What is claimed is:

1. A method for treating the surface of a substrate sheet which comprises coating at least one side of a substrate sheet with a surface treating solution prepared by dissolving in an organic solvent a mixture of 99 to 50 percent by weight of chlorinated polyethylene containing 40 to 75 percent by weight of chlorine and 1 to 50 percent by weight of chlorinated polypropylene containing 25 to 35 percent by weight of chlorine.

2. A method according to claim 1 wherein a layer of the surface treating solution coated on the substrate sheet is further treated with corona discharges.

3. A method according to claim 1 wherein a layer of the surface treating solution coated on the substrate sheet is further treated with flames.

4. A method according to claim 1 wherein the substrate sheet is selected from the group consisting of films of polypropylene and polyethylene.

5. A method according to claim 1 wherein the substrate sheet is selected from the group consisting of films of polyesters, polyamide, polyvinyl alcohol, polyacrylonitrile, polyvinyl chloride, polyvinylidene chloride and cellulose, aluminum foil and cotton cloth.

6. A method according to claim 1 wherein the organic solvent is toluene.

* * * * *

UNITED STATES PATENT OFFICE
CERTIFICATE OF CORRECTION

Patent No. 3,619,242　　　　　　　　　　Dated November 9, 1971

Inventor(s)　　　Masao Ogawa et al.

It is certified that error appears in the above-identified patent and that said Letters Patent are hereby corrected as shown below:

Column 5, lines 1 through 75 should appear as shown below:

there was not conducted a flame treatment prior to the formation of an undercoating material and that treatment after the application of said undercoating material was carried out with corona discharges as in example 1 in place of using flames. The polyvinyl alcohol film on which was bonded a top layer by the aforementioned treatment was rendered heat sealable, the stripping strength of the film being 130 g./cm. (130°C.) Since the undercoating material was a one-liquid system, said treatment was performed with great ease. Heretofore, there has not been known at all any undercoating material displaying such prominent effect.

EXAMPLE 7

A biaxial stretched polypropylene film was treated with corona discharges in the same manner as in example 1, and then coated with an undercoating material in the same manner as in example 3. There was again conducted a corona discharge treatment as in example 1. On the undercoating layer thus treated was extruded polyethylene to a thickness of

UNITED STATES PATENT OFFICE
CERTIFICATE OF CORRECTION

Patent No. 3,619,242          Dated    November 9, 1971

Inventor(s)   Masao Ogawa et al.                 PAGE - 2

It is certified that error appears in the above-identified patent and that said Letters Patent are hereby corrected as shown below:

50 microns to form a laminate film. Unlike the undercoating material made of the aforesaid alkyl titanate or isocyanate system which has heretofore been used in such laminate film, the undercoating material employed in this example was easy to handle and prevented the bonding effect from being reduced due to absorption of moisture or other unfavorable causes. Further this undercoating material caused the biaxial stretched polypropylene film and polyethylene layer to be bonded together with an extremely great strength. The laminate film of the present invention bonded with the undercoating material prepared according to this example exhibited an adhesive strength of 150 g./cm. as against 120 g./cm. of a similar film bonded with the prior undercoating material.

EXAMPLE 8

A non-stretched polypropylene film was subjected to the same flame treatment as in example 3. On the film thus treated was formed an undercoating layer in the same manner as in example 2. The same flame treatment was again applied to the undercoating layer, on which there was laminated polyethylene in the same manner as in example 7. The resultant laminate film displayed the same properties as that of example 7.

UNITED STATES PATENT OFFICE
CERTIFICATE OF CORRECTION

Patent No. 3,619,242  Dated November 9, 1971

Inventor(s) Masao Ogawa et al.   PAGE - 3

It is certified that error appears in the above-identified patent and that said Letters Patent are hereby corrected as shown below:

EXAMPLE 9

One side of an aluminium foil was coated with the same undercoating material as in example 1. After drying for 0.5 minute at a temperature of 80°C., polyethylene was laminated thereon in the same manner as in example 7. This laminating process eased the treating operation as much as in example 7, and laminate film displayed a superior adhesivity of 120 g./cm. to 100 g./cm. of a similar product of the prior art.

EXAMPLE 10

One side of a cotton cloth was subjected to the gravure coating of a 10 per cent toluene solution of the same chlorinated polyethylene as in example 1. After drying for 0.6 minute at a temperature of 80°C., there was formed an undercoating layer, on which was then extruded polyethylene to a thickness of 15 microns for lamination. The laminate product had an adhesive strength of 200 g./cm. In this example, as well as in example 7, the undercoating material was far easier to handle than that prepared by the prior art, so that operation was performed smoothly.

UNITED STATES PATENT OFFICE
CERTIFICATE OF CORRECTION

Patent No. 3,619,242　　　　　　　Dated November 9, 1971

Inventor(s) Masao Ogawa et al.　　　　PAGE — 4

It is certified that error appears in the above-identified patent and that said Letters Patent are hereby corrected as shown below:

EXAMPLE 11

A biaxial stretched polypropylene film was subjected to the same flame treatment as in example 3. One side of the film was then coated with a 10 per cent toluene solution of the same chlorinated polyethylene as in example 3 to a thickness of 2 microns excepting that said polyethylene had a viscosity of --

Signed and sealed this 18th day of July 1972.

(SEAL)
Attest:

EDWARD M. FLETCHER, JR.　　　　ROBERT GOTTSCHALK
Attesting Officer　　　　　　　　Commissioner of Patents